United States Patent [19]

Iida et al.

[11] 4,051,496
[45] Sept. 27, 1977

[54] REMOTE CONTROL CAMERA

[75] Inventors: Yozo Iida, Komae; Shigeo Akasaka, Kodaira; Yasuhito Kawahara, Tokyo, all of Japan

[73] Assignee: Nippon Kogaku K.K., Tokyo, Japan

[21] Appl. No.: 654,333

[22] Filed: Feb. 2, 1976

[30] Foreign Application Priority Data

Feb. 12, 1975 Japan .............................. 50-18566[U]

[51] Int. Cl.$^2$ .............................................. G03B 13/02
[52] U.S. Cl. .................................... 354/219; 354/266; 354/295; 352/141; 352/179
[58] Field of Search ................... 354/219, 76, 53, 154, 354/152, 295, 75, 266, 67; 352/131, 141, 179; 343/225; 340/221

[56] References Cited

U.S. PATENT DOCUMENTS 3,883,883  5/1975  Sano et al. .......................... 354/75

*Primary Examiner*—John Gonzales
*Attorney, Agent, or Firm*—Fitzpatrick, Cella, Harper & Scinto

[57] ABSTRACT

A remote control camera having a fitting member for mounting thereon a signal receiving device to receive a remote control signal, the body of the signal receiver, when fitted on the camera body, serving to cover the entire eye-piece on the camera body to intercept light entering into the camera body through the eye-piece.

2 Claims, 6 Drawing Figures

FIG. 1
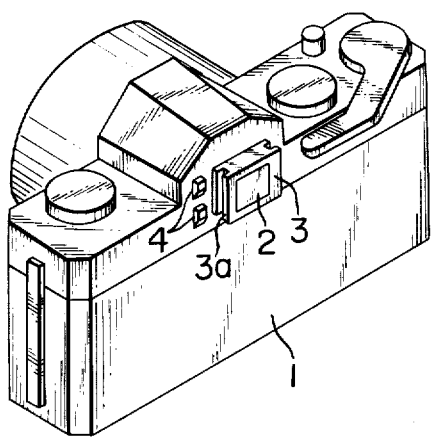
FIG. 2
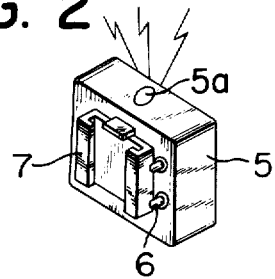
FIG. 3
FIG. 5
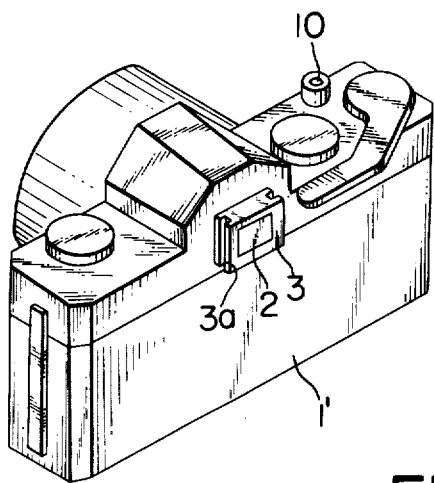
FIG. 4
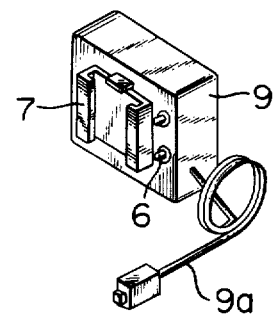
FIG. 6
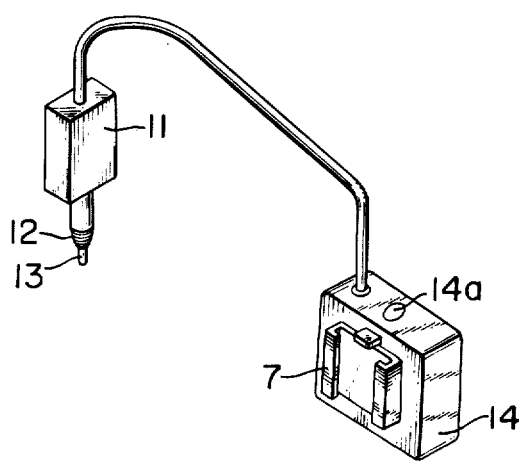

— 1 —

REMOTE CONTROL CAMERA

BACKGROUND OF THE INVENTION

1. Field of the Invention

This invention relates to remote control cameras of various types such as photographic cameras, movie cameras, and so forth, onto which a signal receiver for performing remote control photographic operations is mounted.

2. Description of the Prior Art

Heretofore, it has been experienced that, when remote control phototaking operations are to be carried out by means of a photographic camera, cinematographic camera etc. under a normal lighting condition, the sun beams directly enter into the camera body through an eye-piece thereof adversely to affect a light receiving element for an exposure meter, etc., thereby causing an improper exposure value to be indicated, and such incident light also adversely affects a film surface within the camera body, particularly in the movie camera. In order to avoid such disadvantage in the conventional photographic camera, etc., there has been proposed an eye-piece shutter to intercept such incident light through the eye-piece at the time of phototaking. In such device, however, a setting operation needs be conducted to close the eye-piece with the shutter in advance of the phototaking, which operation is often overlooked by a photographer.

SUMMARY OF THE INVENTION

In view of the above-described disadvantages in the conventional cameras, it is an object of the present invention to provide a camera capable of perfectly eliminating undesirable influence due to incident light into the camera body through the eye-piece at the time of performing the remote control phototaking operations.

The foregoing object and other objects as well as the construction and the resulting functions of the device according to the present invention will become more apparent from the following detailed description of the invention, when read in connection with the accompanying drawing.

BRIEF DESCRIPTION OF DRAWING

In the drawing:

FIG. 1 is a perspective view showing one embodiment of the remote control camera according to the present invention;

FIG. 2 is a perspective view of a light signal receiving device to be mounted on the camera shown in FIG. 1;

FIG. 3 is also a perspective view showing a wireless signal receiving device to be mounted on the camera shown in FIG. 1;

FIG. 4 is a perspective view of the remote control unit to be mounted on the camera shown in FIG. 1;

FIG. 5 is a perspective view showing another embodiment of the remote control camera according to the present invention; and FIG. 6 is a perspective view of the light signal receiver to be mounted on the camera shown in FIG. 5.

DETAILED DESCRIPTION OF THE PREFERRED EMBODIMENT

Referring now to FIG. 1 which illustrates the first embodiment of the present invention, a view finder 2 and eye-piece 3 are provided on one part of the body 1 of a motor-driven photographic camera. The eye-piece 3 has fitting grooves or any other expedients 3a. The camera body is further provided with connectors 4.

In FIG. 2, a light signal receiving device 5 is provided with a light signal receiving member 5a which receives a signal from a light signal emitting device (not shown), connectors 6 which transmit the signal received at the light signal receiving member 5a, and an engagement member 7 to be engaged with the fitting member 3a provided on the eye-piece 3.

The operations of the remote control camera of the above-described construction will now be explained in the following.

The engagement member 7 on the light signal receiving device 5 is engaged with the fitting member 3a of the eye-piece provided on the camera body 1 so that the light signal receiving device 5 may be fitted onto the camera body 1. In this case, the main body of the light signal receiving device 5 serves as an interceptor against any undesirable light beam to enter into the camera body through the eye-piece 3, and at the same time, the connectors 6 on the light signal receiving device 5 are contacted with the connectors 4 on the camera body 1.

After the light signal receiving device 5 is thus fitted on the camera body 1, when a light signal for commencing the phototaking operation is received from the light signal emitter (not shown), the signal for the phototaking operation is transmitted to the connectors 4 on the camera body 1 through the connectors 6 on the light signal receiving device 5, and the camera commences the phototaking operation. When the light signal receiving member 5a receives a signal for stopping the phototaking operation, such signal is transmitted to the camera in the same way as that of transmitting the signal for commencing the phototaking operation, and the camera stops its operation.

In the foregoing explanations, the motor-driven camera has been used as an object, but any other types of camera such as, for example, cinematographic camera, etc. may of course by used for the purpose of the present invention. Moreover, the connectors provided on the camera body need not always be in contact with the connectors on the light signal receiving device when the latter is to be mounted on the former, as has been described with reference to the first embodiment, but they both can be connected by a transmission line or cord, through which the signal received by the receiver may be transmitted to the camera body.

Referring to FIG. 5 illustrating the second embodiment of the present invention, the point of difference from the first embodiment resides in that, instead of transmitting the received light signal through the electrical contacts, a release adaptor 11 which makes a mechanical connection with a known type of shutter release button 10 on the camera body is provided, through which the received signal is transmitted.

In this embodiment, a male screw thread 12 formed on the tip end part of the release (FIG. 6) is screw-engaged with the female screw thread formed in the shutter release button 10 of the camera body 1'. When the light signal receiving member 14a of the light signal receiving device 14 receives a signal for commencing the phototaking operation, the received signal is transmitted to the release adaptor 11, whereupon a plunger 13 is pushed out by means of a solenoid, etc. (not shown) accommodated in the adaptor 11 to release the charged shutter of the camera 1'.

This second embodiment may be used in place of a self-timer for photographic cameras in general, a shutter release for a motor-operated film winder, or a movie camera having no electrical connecting part.

As is understandable from the above, means for transmitting a received signal by the receiver of the shutter release means may be either electrically or mechanically operated.

The fitting member 3 to be provided on the camera body 1 is not always required to be at the eye-piece, but it may be provided at any other appropriate position than at the eye-piece. According to the present invention, the intended object of intercepting light which would enter into the camera body through the eye-piece can be simply realized by covering the eye-piece with the main body of the light signal receiving device to be mounted on the camera body.

The foregoing explanations have been made with reference to the light signal receiving device 5, 14 as shown in FIGS. 2 and 6. It should however be noted that those as shown in FIGS. 3 and 4, i.e., the wireless signal receiver 8 having an antenna 8a in FIG. 3 and the remote control unit 9 having a connecting cable 9a in FIG. 4, may be used.

As has been described in the foregoing, the camera according to the present invention is able to intercept incident light into the camera body through the eye-piece by simply mounting the signal receiver of the remote control device, so that undesirable effects caused by failure of the light intercepting operation can be prevented, and no eye-piece shutter need be provided, which contributes to simplification of the camera construction.

Although the present invention has been described in particular reference to the preferred embodiments thereof, is should be noted that these embodiments are merely illustrative and not so restrictive, and that any change and modification may be made by those skilled in the art without departing from the spirit and scope of the invention as recited in the appended claims.

What is claimed is:

1. A remote control camera which comprises:
    a camera body;
    an eye-piece associated with said camera body; and
    means for mounting and dismounting a signal receiving device which actuates the camera upon receipt of a remote control signal, said mounting and dismounting means being provided at an appropriate position on said camera body so that the body of said signal receiving device may be mounted at a position where it entirely covers said eye-piece of the camera to prevent any undesirable light from entering into the camera body through the eye-piece, said signal receiving device having engaging means corresponding to said mounting and dismounting means.

2. The remote control camera as claimed in claim 1, further comprising means for transmitting the remote control signal, said signal transmitting means being provided at said signal receiving device and said camera body and adapted to be connected when said signal receiving device is mounted on said camera body.

* * * * *